United States Patent
Kanazawa et al.

(10) Patent No.: US 8,843,185 B2
(45) Date of Patent: Sep. 23, 2014

(54) SLIDE-TYPE WIRELESS TERMINAL APPARATUS

(75) Inventors: Masaru Kanazawa, Kawasaki (JP); Zhao Liu, Kawasaki (JP); Kouji Soekawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 13/239,808

(22) Filed: Sep. 22, 2011

(65) Prior Publication Data

US 2012/0115336 A1 May 10, 2012

(30) Foreign Application Priority Data

Nov. 5, 2010 (JP) ................. 2010-249185

(51) Int. Cl.
- H04M 1/00 (2006.01)
- H01Q 1/24 (2006.01)
- H01Q 1/48 (2006.01)
- H04M 1/02 (2006.01)
- H01Q 9/04 (2006.01)

(52) U.S. Cl.
CPC ............. H01Q 1/243 (2013.01); H04M 1/0237 (2013.01); H01R 2201/02 (2013.01); H01Q 1/48 (2013.01); H01Q 9/0407 (2013.01)
USPC .................. 455/575.4; 455/575.7; 455/575.1

(58) Field of Classification Search
CPC .... H01Q 1/243; H01Q 9/0407; H04M 1/0237
USPC ................. 455/575.1, 575.4, 575.7
See application file for complete search history.

(56) References Cited

U.S. PATENT DOCUMENTS

| | | | | |
|---|---|---|---|---|
| 6,720,924 | B2* | 4/2004 | Tomomatsu et al. | 343/700 MS |
| 7,447,530 | B2* | 11/2008 | Iwai et al. | 455/575.7 |
| 7,633,745 | B2* | 12/2009 | Sakakibara et al. | 361/679.11 |
| 7,641,488 | B2* | 1/2010 | Ho et al. | 439/162 |
| 7,733,278 | B2* | 6/2010 | Kanasaki et al. | 343/702 |
| 7,752,710 | B2* | 7/2010 | Lin | 16/334 |
| 7,904,126 | B2* | 3/2011 | Kim et al. | 455/575.4 |
| 7,962,186 | B2* | 6/2011 | Cui et al. | 455/575.7 |

(Continued)

FOREIGN PATENT DOCUMENTS

| | | |
|---|---|---|
| JP | 2002-314316 A | 10/2002 |
| JP | 2006-325098 A | 11/2006 |

(Continued)

OTHER PUBLICATIONS

JPOA—Office Action of Japanese Patent Application No. 2010-249185 dated May 20, 2014 with Partial Translation.

Primary Examiner — Duc M Nguyen
(74) Attorney, Agent, or Firm — Fujitsu Patent Center

(57) ABSTRACT

A slide-type wireless terminal apparatus includes a first casing and a second casing slidable relative to the first casing. The wireless terminal apparatus includes a first circuit board which is provided in the first casing, an antenna which is provided in the first casing, a second circuit board which is provided in the second casing, a sliding member which is disposed between the first circuit board and the second circuit board, the sliding member including a portion which faces the antenna, the sliding member having electrical conductivity and being electrically connected to the first circuit board, and a guide member which is provided in the second casing, the guide member being for guiding the sliding member such that the sliding member slides relative to the guiding member.

15 Claims, 11 Drawing Sheets

(56) References Cited

U.S. PATENT DOCUMENTS

| | | | |
|---|---|---|---|
| 8,121,659 B2* | 2/2012 | Vesamaki | 455/575.4 |
| 8,311,599 B2* | 11/2012 | Hikino | 455/575.4 |
| 8,406,829 B2* | 3/2013 | Kiryu et al. | 455/575.4 |
| 8,611,972 B2* | 12/2013 | Sumi et al. | 455/575.4 |
| 2009/0029741 A1* | 1/2009 | Satou et al. | 455/566 |
| 2010/0307787 A1 | 12/2010 | Ohmori et al. | |
| 2011/0095962 A1* | 4/2011 | Ishii | 343/904 |
| 2011/0254744 A1* | 10/2011 | Sumi | 343/702 |
| 2011/0309998 A1* | 12/2011 | Sakurai | 343/906 |
| 2012/0238333 A1* | 9/2012 | Mori et al. | 455/575.4 |

FOREIGN PATENT DOCUMENTS

| | | |
|---|---|---|
| JP | 2008-182625 | 8/2008 |
| JP | 2009-182791 | 8/2009 |
| JP | 2009-194689 A | 8/2009 |

* cited by examiner

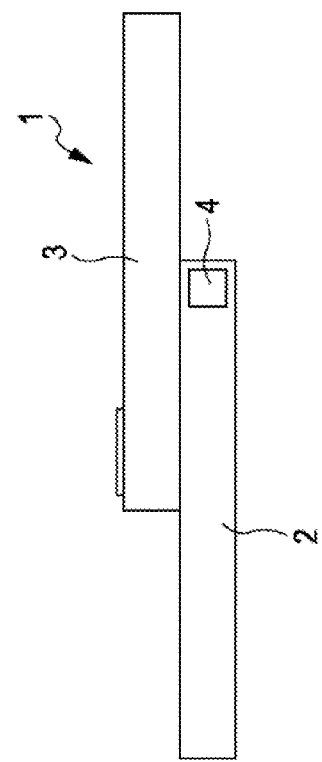
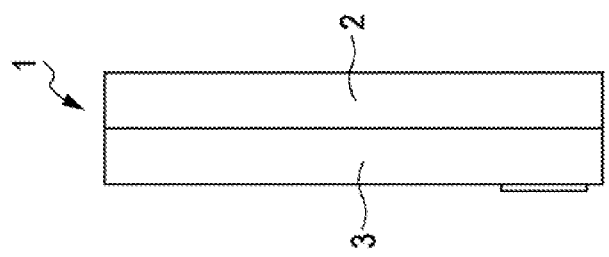
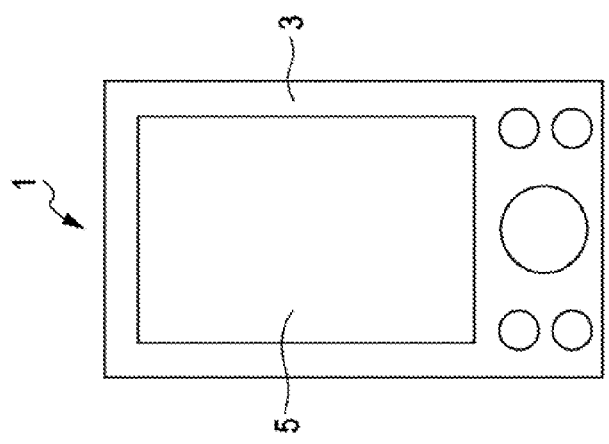

SLIDE-TYPE WIRELESS TERMINAL APPARATUS

CROSS-REFERENCE TO RELATED APPLICATION

This application is based upon and claims the benefit of priority of the prior Japanese Patent Application No. 2010-249185, filed on Nov. 5, 2010, the entire contents of which are incorporated herein by reference.

FIELD

The embodiment discussed herein is related to a slide-type wireless terminal apparatuses.

BACKGROUND

A known slide-type wireless terminal apparatus includes two casings, that is, a fixed casing and a movable casing. The movable casing is slidable relative to the fixed casing.

FIGS. 1A and 1B respectively illustrate a plan view and side view of an example of a slide-type wireless terminal apparatus in a casing-closed state, and FIG. 1C illustrates a side view of the example of the slide-type wireless terminal apparatus in a casing-open state.

A slide-type wireless terminal apparatus 1 includes a fixed casing 2 and a movable casing 3. The fixed casing 2 includes components such as a battery and an antenna 4. The movable casing 3 includes a display portion 5.

FIGS. 2A and 2B respectively illustrate sectional views of the example of the slide-type wireless terminal apparatus in the casing-open state and the casing-closed state.

The fixed casing 2 is provided with a slide module 7 in a surface that contacts the movable casing 3, and the movable casing 3 is provided with a rail plate 8 in a surface that contacts the fixed casing 2. The slide module 7 of the fixed casing 2 is engaged with the rail plate 8 of the movable casing 3 so as to allow the movable casing 3 to slide. Thus, the state of the slide-type wireless terminal apparatus 1 changes from the casing-open state illustrated in FIG. 2A to the casing-closed state illustrated in FIG. 2B, and from the casing-closed state to the casing-open state.

In the related art fixed casing 2, a distal end of the slide module 7 does not extend to the antenna 4 position in the Y direction, which is the longitudinal direction of the casing. The antenna 4 and the slide module 7 are disposed such that the slide module 7 and the antenna 4 do not oppose each other in the Z direction.

A technology is disclosed, in which an electrically conductive member is electrically connected to a ground pattern of a lower board and disposed at a position that is on a surface opposing a surface of the lower board in which an antenna element is disposed and that allows the electrically conductive member to be capacitively coupled to a flexible cable. In the technology, when a lower casing and an upper casing are closed, the electrically conductive member serves as a ground plate for the antenna element. In a slid open state, in which the upper casing has been slid relative to the lower casing, the electrically conductive member is capacitively coupled to the flexible cable so as to obtain an optimum capacitance as well as serving as a ground plate for the antenna element, thereby causing the current flowing in the lower board and the current flowing in the upper board to be in phase (refer to, for example, Japanese Laid-open Patent Publication No. 2009-194689).

A slide-type mobile phone including a board for operation portion having an antenna element formed on the board is also known (refer to, for example, Japanese Laid-open Patent Publication No. 2006-325098).

There is also a known technology in which a chip antenna is mounted on a board such that a power feeding terminal side of an antenna conductor overlaps a ground pattern, and a portion of the antenna that is closer to an end than the power feeding terminal side portion does not overlap the ground pattern. The chip antenna includes a meandering antenna conductor, and the portion of the meandering antenna conductor where the conductor is closely folded partially or entirely overlaps the ground pattern (refer to, for example, Japanese Laid-open Patent Publication No. 2002-314316).

As illustrated in FIG. 1C, the fixed casing 2 partially overlaps the movable casing 3 in the slide-type wireless terminal apparatus 1 in the casing-open state. When the case current (or image current) flows in the longitudinal direction of the casing, it is desirable that the current flowing in a board of the fixed casing 2 and the current flowing in a board of the movable casing 3 in the casing-open state are in phase, the currents flowing in the same direction as illustrated by the arrows in FIG. 3A.

However, in the 800 MHz frequency band, the current flowing in the board of the fixed casing 2 and the current flowing in the board of the movable casing 3 in the casing-open state are completely out of phase as illustrated by the arrows in FIG. 3B. This degrades the transmission/reception characteristics in many cases.

Effects that degrade the transmission/reception characteristics are reduced by increasing the distance between the fixed casing 2 and the movable casing 3. However, since the size and the thickness of terminal apparatuses are being increasingly reduced, maintaining a large distance between the casings would decrease competitiveness of the products.

SUMMARY

According to an aspect of an embodiment, a slide-type wireless terminal apparatus includes a first casing and a second casing slidable relative to the first casing. The wireless terminal apparatus includes a first circuit board which is provided in the first casing, an antenna which is provided in the first casing, a second circuit board which is provided in the second casing, a sliding member which is disposed between the first circuit board and the second circuit board, the sliding member including a portion which faces the antenna, the sliding member having electrical conductivity and being electrically connected to the first circuit board, and a guide member which is provided in the second casing, the guide member being for guiding the sliding member such that the sliding member slides relative to the guiding member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a plan view of an example of a slide-type wireless terminal apparatus.

FIG. 1B is a side view of the example of the slide-type wireless terminal apparatus.

FIG. 1C is a side view of the example of the slide-type wireless terminal apparatus.

DESCRIPTION OF EMBODIMENTS

Embodiments will be described below with reference to the drawings.

Structure of Slide-Type Wireless Terminal Apparatus

Figure 4C:
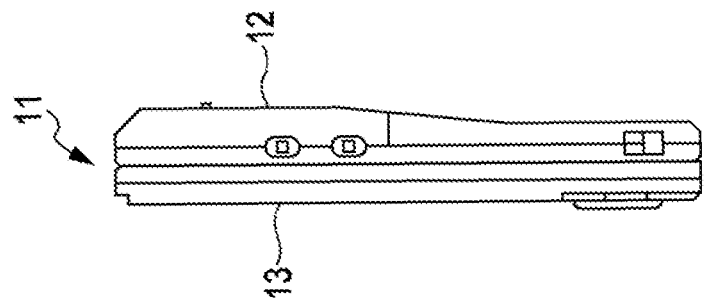
FIGS. 4A, 4B, and 4C are respectively a perspective view, a plan view, and a side view of a slide-type wireless terminal apparatus according to an embodiment.
Figure 4B:
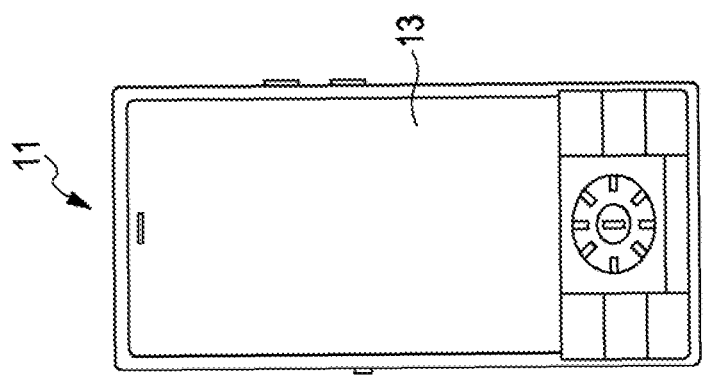
Figure 4A:
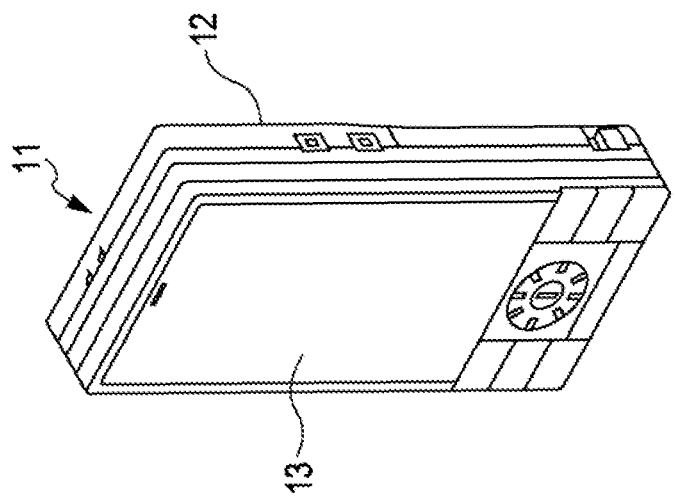
Figure 5C:
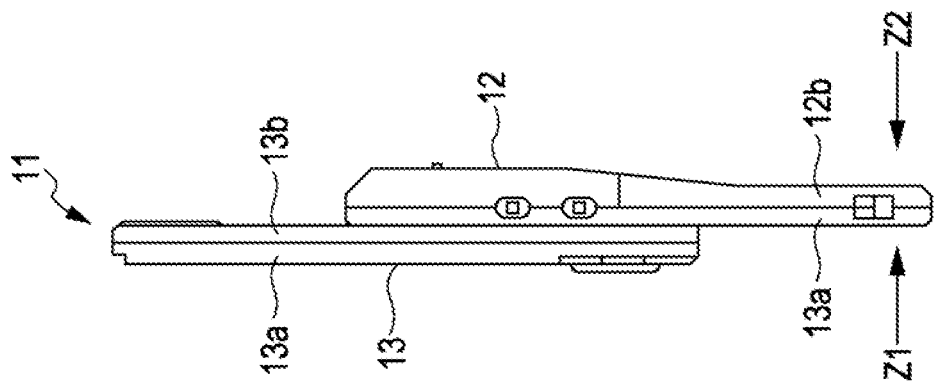
FIGS. 5A, 5B, and 5C are respectively a perspective view, a plan view, and a side view of the slide-type wireless terminal apparatus according to the embodiment.
Figure 5B:
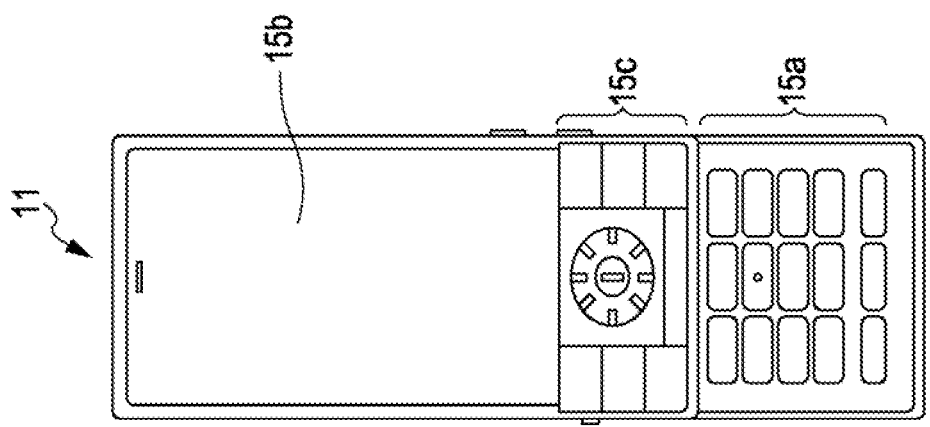
Figure 5A:
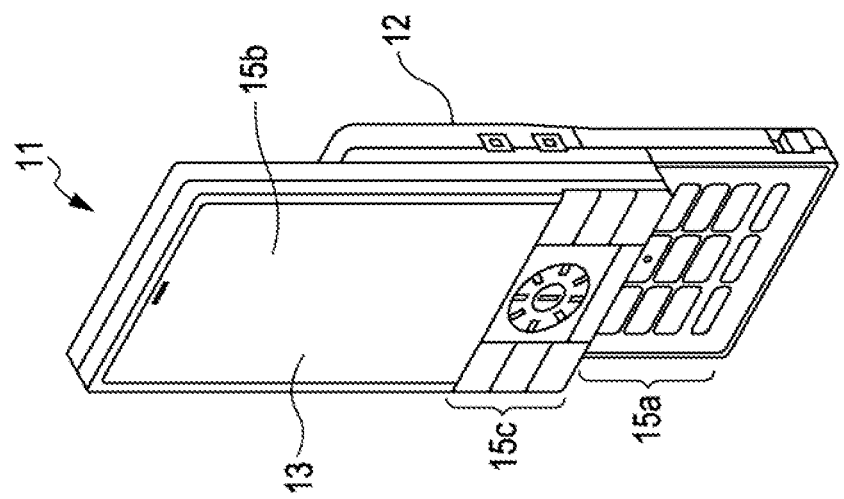

FIGS. 4A, 4B, and 4C are respectively a perspective view, a plan view, and a side view of a slide-type wireless terminal apparatus in a casing-closed state according to an embodiment. FIGS. 5A, 5B, and 5C are respectively a perspective view, a plan view, and a side view of a slide-type wireless terminal apparatus in a casing-open state according to the embodiment.

The slide-type wireless terminal apparatus according to the present embodiment includes a first casing and a second casing. Referring to FIGS. 4A to 4C and 5A to 5C, a slide-type wireless terminal apparatus 11 includes a fixed casing 12 as the first casing and a movable casing 13 as the second casing. The fixed casing 12 includes a front half 12a, a rear half 12b, and a first operation portion 15a. The fixed casing 12 houses a battery and an antenna. The movable casing 13 includes a front half 13a, a rear half 13b, a display portion 15b, and a second operation portion 15c.

First Embodiment

Figure 6:
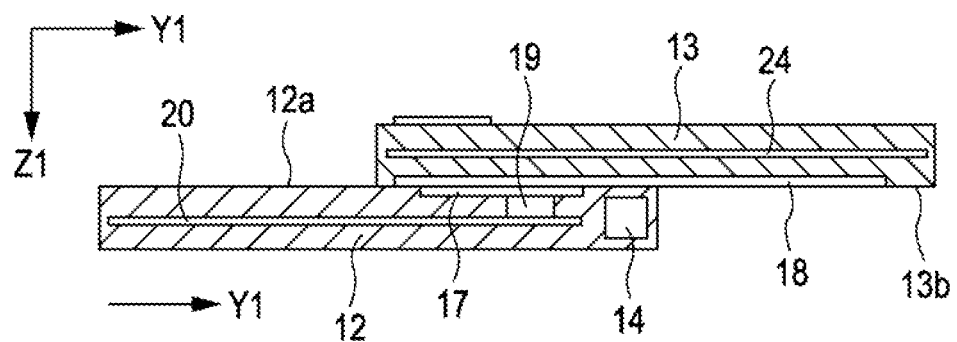
FIG. 6 is a sectional view of a slide-type wireless terminal apparatus according to a first embodiment.
Figure 7:
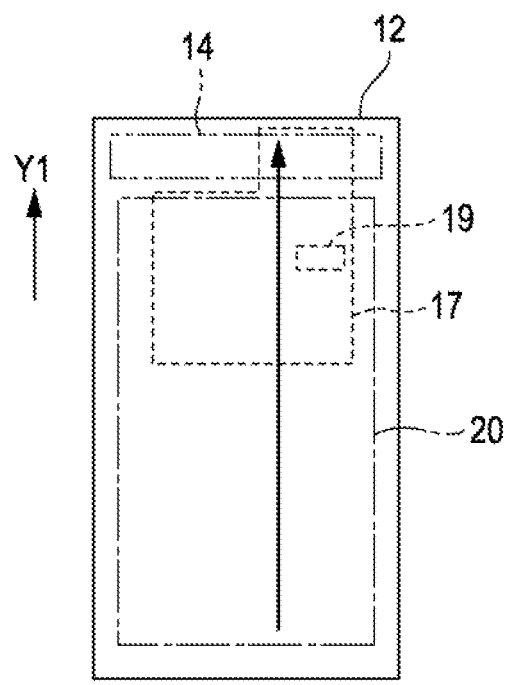
FIG. 7 is a plan view of a fixed casing of the slide-type wireless terminal apparatus according to the first embodiment.

FIG. 6 illustrates a sectional view of the slide-type wireless terminal apparatus according to a first embodiment, and FIG. 7 illustrates a plan view of a fixed casing 12 of the slide-type wireless terminal apparatus according to the first embodiment.

In FIG. 6, the fixed casing 12 is provided with a slide module 17 formed of metal or the like on an outer side of the front half 12a that contacts the movable casing 13, and the movable casing 13 is provided with a rail plate 18 in the rear half 13b that contacts the fixed casing 12. The fixed casing 12 houses a circuit board 20 therein, and the movable casing 13 houses a circuit board 24 therein. The slide module 17 of the fixed casing 12 is engaged with the rail plate 18 of the movable casing 13 so as to allow the movable casing 13 to slide. Thus, the state of the slide-type wireless terminal apparatus 11 changes from the casing-open state to the casing-closed state, and from the casing-closed state to the casing-open state.

Referring to FIGS. 6 and 7, in the fixed casing 12, the distal end of the slide module 17 extends to the position of an antenna 14 in a Y1 direction, which is the longitudinal direction of the casing. The antenna 14 and the slide module 17 are disposed between the fixed casing 12 and the movable casing 13 such that the slide module 17 partially or entirely opposes the antenna 14 in a Z1 direction, which is a thickness direction of the casing. The slide module 17 is connected to a ground wiring pattern of the circuit board 20 that is housed in the fixed casing 12 using connecting members 19 such as metal screws.

A metal component of the fixed casing 12 disposed closest to the movable casing 13 is the slide module 17. The phases of the case current (or image currents) flowing in the circuit board 20 in the fixed casing 12 and the current flowing in the circuit board 24 in the movable casing 13 are determined in accordance with a positional relationship between the slide module 17 and the circuit board 24 housed in the movable casing 13, and the area of the slide module 17.

The slide module 17 is an example of, for example, a sliding member, and the rail plate 18 is an example of, for example, a guide member.

Figure 2A:
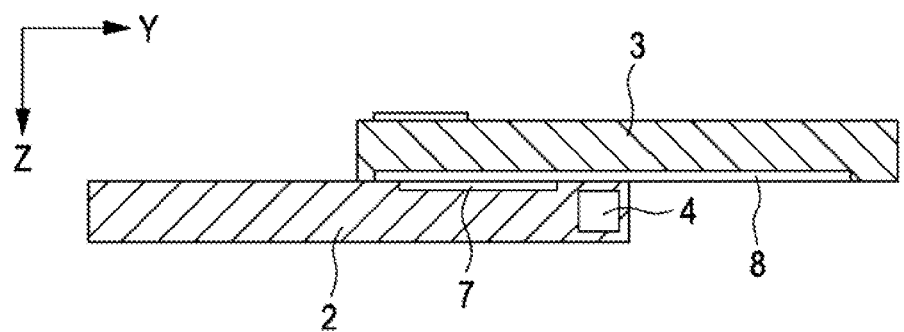
FIGS. 2A and 2B are sectional views of the example of the slide-type wireless terminal apparatus in the casing-open state and the casing-closed state.
Figure 2B:
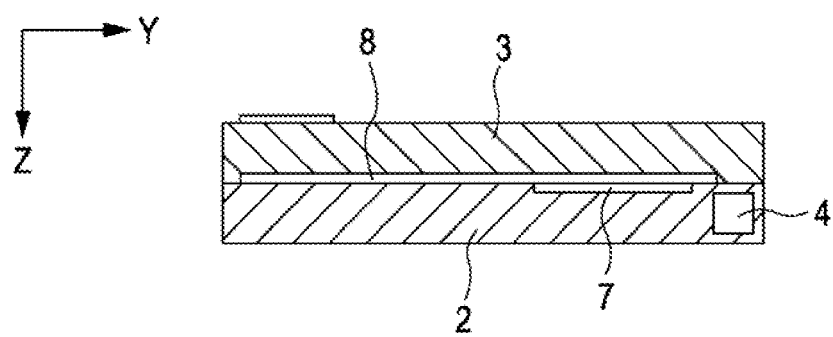
Figure 3A:
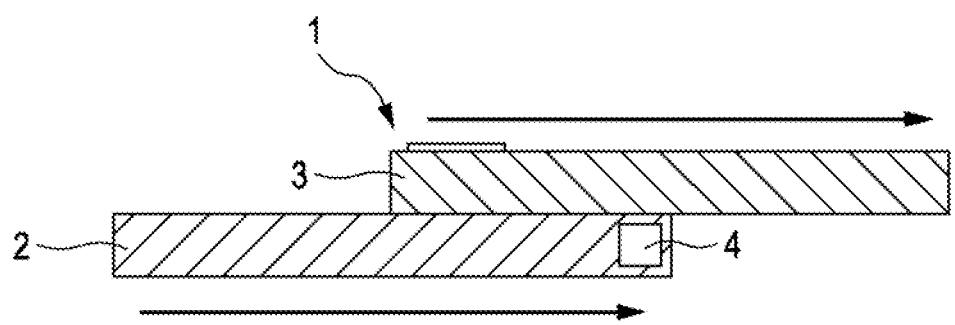
FIGS. 3A and 3B illustrate the phases of the currents flowing in a fixed casing and a movable casing.
Figure 3B:
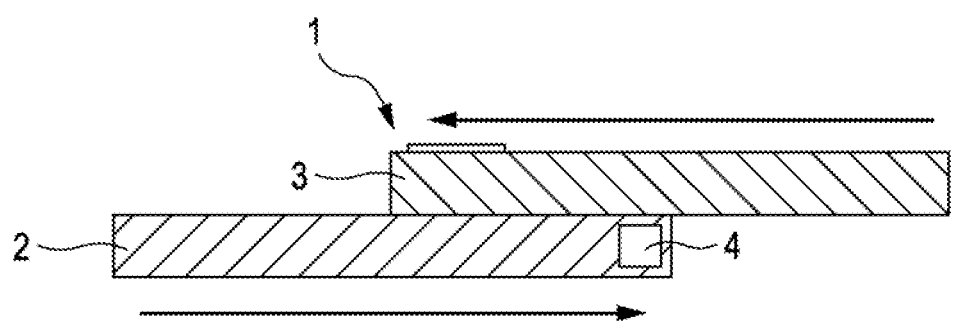

In a structure illustrated in FIG. 2, the distal end of the slide module 7 does not extend to the antenna 4 position so as not to cause the slide module 7 to oppose the antenna 4 in the Z direction, thereby decreasing electromagnetic coupling between the slide module 7 and a circuit board in the movable casing 3.

In contrast, according to the present embodiment, the slide module 17 partially opposes the antenna 14 and is connected to the ground wiring pattern of the circuit board 20 so as to be electromagnetically coupled to the antenna 14. By feeding the power from the antenna 14 to the slide module 17 and the ground wiring pattern of the circuit board 20 by voltage feeding, a new resonance is generated. By changing the amount of coupling between the slide module 17 and the antenna 14, and by changing the area of the slide module 17, the frequency of the resonance is adjusted so as to generate a new resonance at a desired frequency. The above-described new resonance causes the current flowing in the circuit board 20 of the fixed casing 12 and the current flowing in the circuit board 24 of the movable casing 13 in the casing-open state to be in phase.

At this time, the area in which the antenna 14 and the slide module 17 oppose each other is an important parameter. As the area in which the antenna 14 and the slide module 17 oppose each other increases, the amount of electromagnetic coupling increases and the characteristics in the casing-open state is improved. However, when the amount of electromagnetic coupling excessively increases, the characteristics in the casing-closed state degrade. This is because the slide module 17 would function as the ground in the casing-closed state. For this reason, the amount of coupling is determined such that desirable characteristics can be obtained in both of the casing-open state and the casing-closed state. In addition, the resonance frequency can be adjusted also by changing the positions of the connecting members 19 in the Y1 direction.

Second Embodiment

Figure 8:
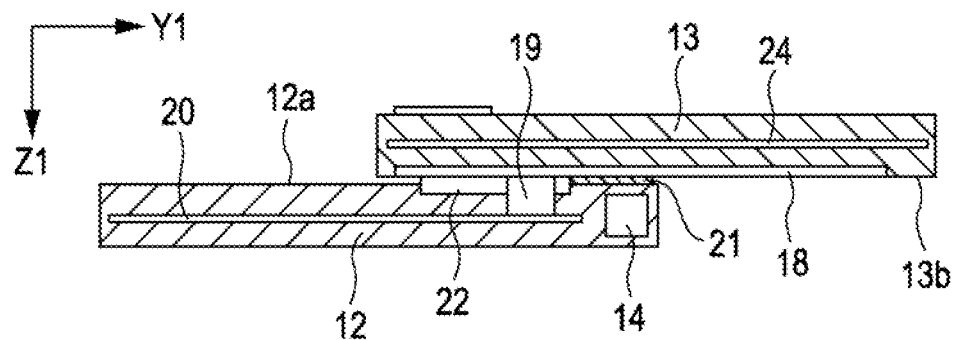
FIG. 8 is a sectional view of a slide-type wireless terminal apparatus according to a second embodiment.

FIG. 8 illustrates a sectional view of the slide-type wireless terminal apparatus including the first casing and the second casing according to a second embodiment.

In FIG. 8, the fixed casing 12 as the first casing is provided with copper tape 21 on the outer side of the front half 12a that contacts the movable casing 13 as the second casing. The fixed casing 12 is also provided with a metal slide module 22. The copper tape 21 is electrically connected to the slide module 22. The fixed casing 12 houses the circuit board 20 therein, and the movable casing 13 houses the circuit board 24 therein.

The movable casing 13 is provided with the rail plate 18 in the rear half 13b that contacts the fixed casing 12. The slide module 22 of the fixed casing 12 is engaged with the rail plate 18 of the movable casing 13 so as to allow the movable casing 13 to slide. Thus, the state of the slide-type wireless terminal apparatus 11 changes from the casing-open state to the casing-closed state, and from the casing-closed state to the casing-open state.

In the fixed casing 12, the distal end of the copper tape 21, which is connected to the slide module 22, extends to the antenna 14 position in the Y1 direction, which is the longitudinal direction of the casing. The antenna 14 and the copper tape 21 are disposed between the fixed casing 12 and the movable casing 13 such that the copper tape 21 partially or entirely opposes the antenna 14 in the Z1 direction. The slide module 22 is connected to the ground wiring pattern of the circuit board 20 that is housed in the fixed casing 12 using the connecting members 19 such as metal screws. Here, the copper tape 21 corresponds to, for example, electrically conductive tape.

In the first embodiment, the size of the slide module 17 is adjusted. However, the adjustment of the size of the slide module 17 is difficult in application because of strength restrictions. For this reason, in the second embodiment, the copper tape 21 is added as a separate metal component and connected to the slide module 22 so as to electrically increase the size of the slide module 17. The size of the copper tape 21 can be desirably changed, thereby increasing versatility in design. Also in the second embodiment, the resonance frequency can be adjusted also by changing the positions of the connecting members 19 in the Y1 direction.

Details of Second Embodiment

Figure 9:
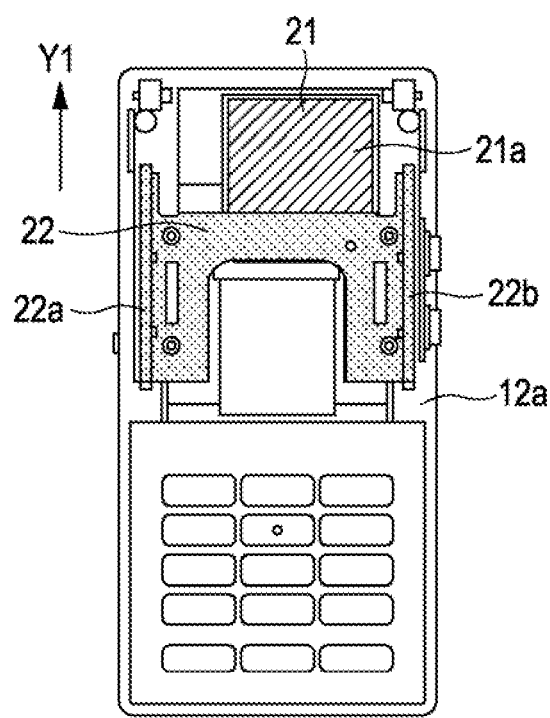
FIG. 9 is a plan view of a fixed casing seen from a front side.

FIG. 9 is a plan view of the fixed casing 12 seen from the front side (arrow Z1 direction in FIG. 5C).

In FIG. 9, the copper tape 21 is attached to the outer surface of the front half 12a. The metal slide module 22 is provided at a position in which the slide module 22 opposes part of the copper tape 21 and connected to the copper tape 21. The slide module 22 is secured to the front half 12a with screws.

Figure 10:
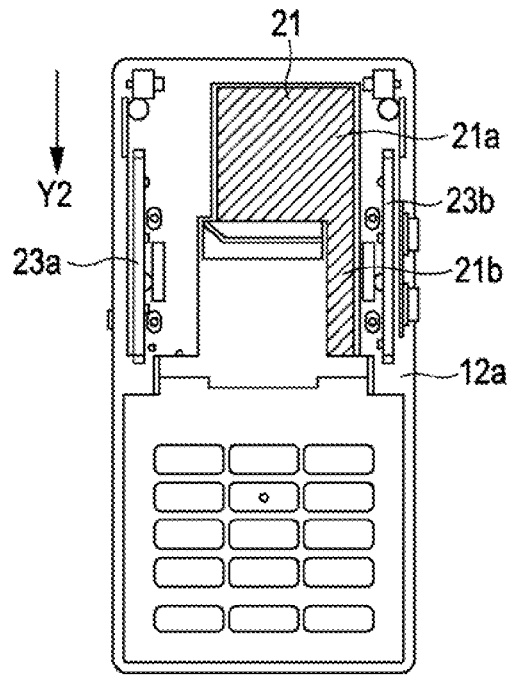
FIG. 10 is a plan view of the fixed casing illustrated in FIG. 9 with a slide module removed.

FIG. 10 is a plan view of the fixed casing 12 illustrated in FIG. 9 with the slide module 22 removed. In FIG. 10, the copper tape 21 has a protrusion 21b so as to extend from a rectangular main body 21a in the arrow Y2 direction, which is the longitudinal direction of the casing. The main body 21a of the copper tape 21 is attached to the front half 12a, and the protrusion 21b of the copper tape 21 is bonded to the slide module 22 so as to electrically connect the copper tape 21 to the slide module 22. Alternatively, the copper tape 21 may be attached to an inner surface of the front half 12a. In this case, the copper tape 21 is electrically connected to the slide module 22 with metal screws or the like that secure the slide module 22 to the front half 12a.

The front half 12a has grooves 23a and 23b formed therein. Part of legs 22a and 22b of the slide module 22 are respectively engaged with the grooves 23a and 23b so as to be positioned in the grooves 23a and 23b. Thus, the slide module 22 is secured to the front half 12a.

Figure 11:
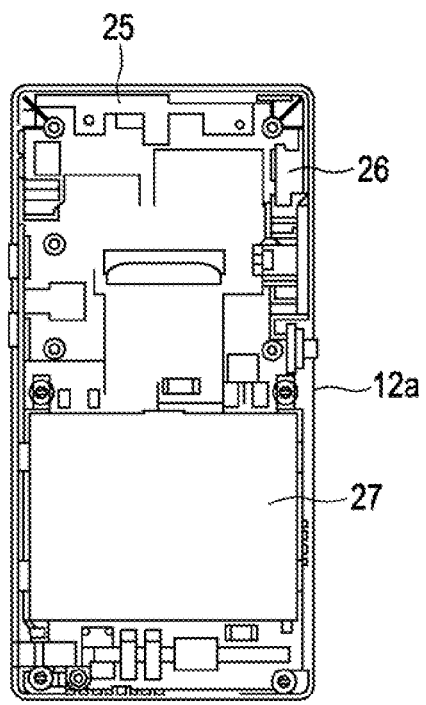
FIG. 11 is a plan view of the fixed casing with a rear half thereof removed seen from a front side.

FIG. 11 is a plan view of the fixed casing 12 with the rear half 12b removed seen from the rear side (arrow Z2 direction in FIG. 5C).

In FIG. 11, an antenna 25 for the 800 MHz band is disposed in an upper edge portion of the fixed casing 12 and secured to the front half 12a. The antenna 25 corresponds to the antenna 14 illustrated in FIGS. 6 to 8. An antenna 26 for the 2 GHz band is disposed in an upper side of a right edge portion of the fixed casing 12 and secured to the front half 12a. A secondary battery 27 is disposed in a portion below the center of the fixed casing 12.

Figure 12:
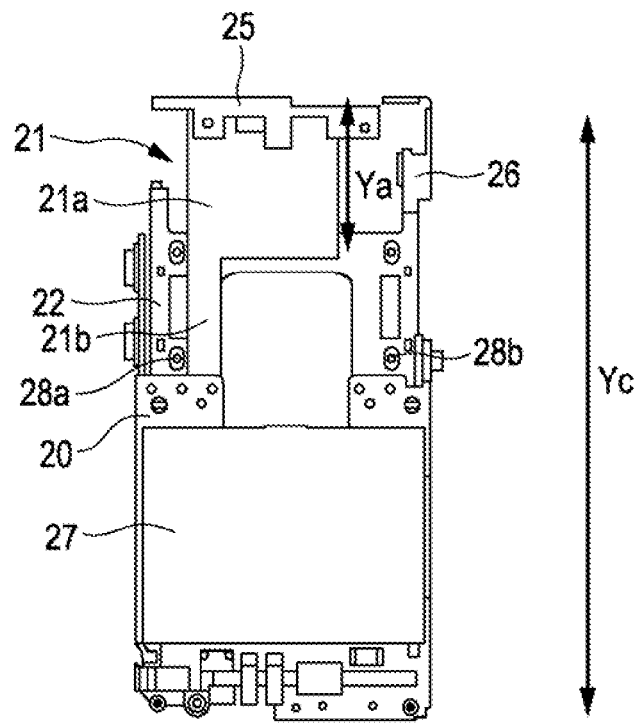
FIG. 12 is a plan view of the fixed casing illustrated in FIG. 11 with a front half removed.
Figure 13:
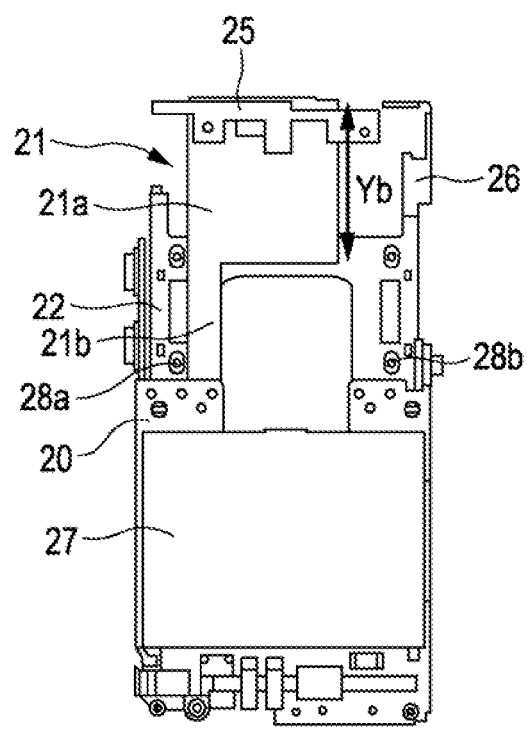
FIG. 13 is a plan view of the fixed casing illustrated in FIG. 11 with the front half removed.

FIGS. 12 and 13 are plan views illustrating the fixed casing 12 illustrated in FIG. 11 with the front half 12a and part of the circuit board 20 removed. In FIGS. 12 and 13, the copper tape 21 and the slide module 22 are visible because of the removal of the front half 12a.

In FIG. 12, the length of the main body 21a of the copper tape 21 in the length direction, that is, in the longitudinal direction of the casing is set to Ya. An upper portion of the main body 21a of the copper tape 21 is set to oppose part of the antenna 25. In FIG. 13, the length of the main body 21a of the copper tape 21 in the length direction is set to Yb (Yb>Ya). An upper portion of the main body 21a of the copper tape 21 is set to oppose substantially entire portion of the antenna 25 in the longitudinal direction of the casing. Although the circuit board 20 is partially removed from FIGS. 12 and 13, for example, metal screws screwed through screw holes 28a and 28b secure the slide module 22 to the front half 12a and connect the slide module 22 to the ground wiring pattern of the circuit board 20.

Thus, the amount of electromagnetic coupling between the antenna 25 and the copper tape 21 can be adjusted by changing the length of the main body 21a of the copper tape 21 in the length direction. The amount of electromagnetic coupling between the antenna 25 and the copper tape 21 can also be adjusted by changing the length of the main body 21a of the copper tape 21 in the lateral direction.

Figure 14:
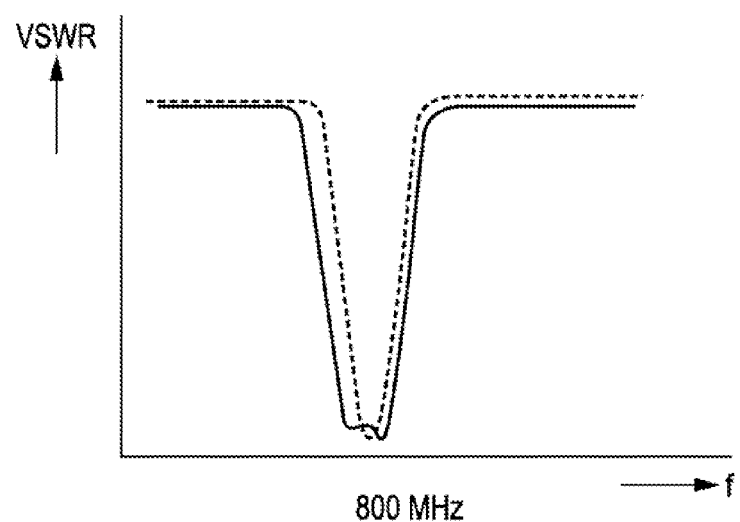
FIG. 14 is a frequency/VSWR characteristics graph of antennae.

Referring to FIG. 14, frequency/voltage standing wave ratio (VSWR) characteristics of the antenna 25 in the casing-open state in the embodiment illustrated in FIGS. 9 to 12 are indicated by a solid line. The dashed line indicates frequency/VSWR characteristics of the antenna 4 of the related art slide-type wireless terminal apparatus in the casing-open state. According to the characteristics of the present embodiment indicated by the solid line, a new resonance is generated with a frequency of about 800 MHz and the frequency VSWR/characteristics are improved around 800 MHz.

Modification of Second Embodiment

Figure 15:
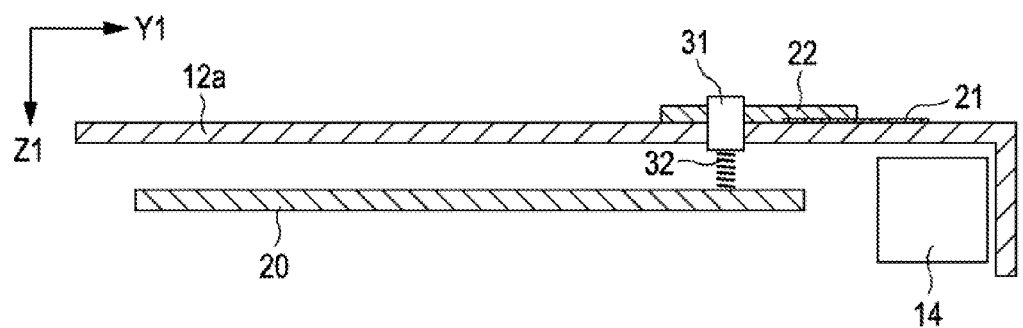
FIG. 15 is a sectional view of the slide-type wireless terminal apparatus according to a modification according to the second embodiment.

FIG. 15 is a sectional view of the slide-type wireless terminal apparatus according to a modification of the second embodiment.

In FIG. 15, the fixed casing 12 is provided with the copper tape 21 on the outer side of the front half 12a that contacts the movable casing 13. The fixed casing 12 is also provided with the metal slide module 22. The copper tape 21 and the slide module 22 are electrically connected to each other. In the fixed casing 12, the distal end of the copper tape 21, which is connected to the slide module 22, extends to the antenna 14 position in the Y1 direction, which is the longitudinal direction of the casing. The antenna 14 and the copper tape 21 are disposed such that the copper tape 21 partially or entirely opposes the antenna 14 in the Z1 direction. The slide module 22 is secured to the front half 12a with metal screws 31. Connecting members 32, which are metal springs or the like, connect the metal screws 31 to land patterns of the circuit board 20.

Figure 16A:
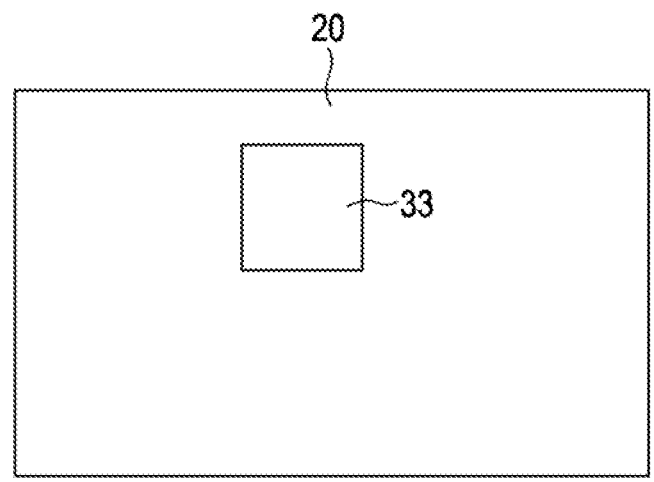
FIGS. 16A and 16B are plan views illustrating part of a circuit board.
Figure 16B:
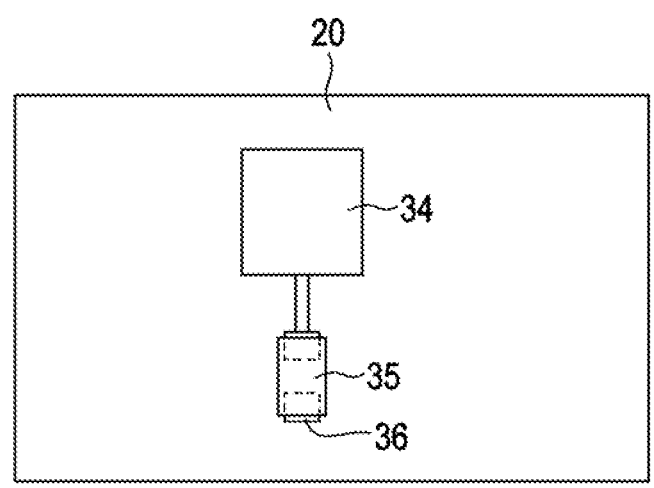

FIGS. 16A and 16B are plan views illustrating part of the circuit board 20. FIG. 16A illustrates one of land patterns 33 that are formed on a surface of the circuit board 20 opposing the front half 12a. One end of each connecting member 32 contacts the corresponding one of the land patterns 33. Each land pattern 33 is connected to the ground wiring pattern (not illustrated).

The amount of coupling that allows desirable characteristics to be obtained in both of the casing-open state and the casing-closed state is set by changing the shape of the slide module 17 or the copper tape 21 in the first or second embodiment. However, when such an amount cannot be set as in the first or second embodiment, an electronic component 35 illustrated in FIG. 16B is used.

FIG. 16B illustrates one of land patterns 34 that are formed on the surface of the circuit board 20 opposing the front half 12a. One end of each connecting member 32 contacts the corresponding one of the land patterns 34. Each land pattern 34 is connected to a ground wiring pattern 36 with the electronic component 35 for adjusting a phase such as a capacitor or a coil therebetween. In this case, by adding inductance or capacitance of the electronic component 35, the amount of coupling that allows desirable characteristics to be obtained in both of the casing-open state and the casing-closed state can be set. Here, the present embodiment is described as the modification of the second embodiment. However, it is clear that the first embodiment may use the structure as illustrated in FIG. 16B.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A slide-type wireless terminal apparatus including a first casing and a second casing slidable relative to the first casing, the wireless terminal apparatus comprising:
    a first circuit board which is provided in the first casing;
    an antenna which is provided in the first casing;
    a second circuit board which is provided in the second casing;
    a sliding member which is disposed between the first circuit board and the second circuit board and is formed on a first surface of the first casing, the sliding member including a portion positioned between the second circuit board and the antenna, the sliding member having electrical conductivity and being electrically connected to the first circuit board; and
    a guide member which is provided on a second surface of the second casing, the second surface being faced with the first surface, the guide member being for guiding the sliding member such that the sliding member slides relative to the guiding member,
    wherein the sliding member is located between the first surface and the second surface, the sliding member opposes the antenna in a thickness direction of the first casing, and the sliding member configured to slide along the guide member in a longitudinal direction of the first casing.

2. The slide-type wireless terminal apparatus according to claim 1, further comprising:
    a ground wiring formed in the first circuit board; and
    an electronic component which is provided between the sliding member and the ground wiring, the electronic component having a phase adjusting function.

3. The slide-type wireless terminal apparatus according to claim 2,
    wherein the electronic component is a coil or a capacitor.

4. The slide-type wireless terminal apparatus according to claim 1, wherein, in the states that the second casing slides relative to the first casing, the portion of the sliding member is located between the antenna and the second circuit board.

5. The slide-type wireless terminal apparatus according to claim 1, further comprising a ground wiring coupled to the sliding member.

6. The slide-type wireless terminal apparatus according to claim 1, wherein the first circuit board is not located between the antenna and the second circuit board.

7. The slide-type wireless terminal apparatus according to claim 1, wherein the thickness direction of the first casing is perpendicular to the longitudinal direction of the first casing.

8. A slide-type wireless terminal apparatus including a first casing and a second casing slidable relative to the first casing, the wireless terminal apparatus comprising:
    a first circuit board which is provided in the first casing;
    an antenna which is provided in the first casing;
    a sliding member which is provided between the first circuit board and the second circuit board and is formed on a first surface of the first casing, the sliding member having electrical conductivity and being electrically connected to the first circuit board;
    a second circuit board which is provided on a second surface of the second casing;
    a guide member which is provided in the second casing, the second surface being faced with the first surface, the guide member being for guiding the sliding member such that the sliding member slides relative to the guide member; and
    a conductive member which is disposed between the first circuit board and the second circuit board, the conductive member including a portion positioned between the second circuit board and the antenna, the conductive member being electrically connected to the sliding member,
    wherein the sliding member is located between the first surface and the second surface, the sliding member opposes the antenna in a thickness direction of the first casing, and the sliding member configured to slide along the guide member in a longitudinal direction of the first casing.

9. The slide-type wireless terminal apparatus according to claim 8, further comprising:
    a ground wiring which is formed in the first circuit board; and
    an electronic component which is provided between the sliding member and the ground wiring, the electronic component having a phase adjusting function.

10. The slide-type wireless terminal apparatus according to claim 9,
    wherein the electronic component is a coil or a capacitor.

11. The slide-type wireless terminal apparatus according to claim 8, wherein the electrically conductive member is a copper tape.

12. The slide-type wireless terminal apparatus according to claim 8, wherein, in the states that the second casing slides relative to the first casing, the conductive member is located between the antenna and the second circuit board.

13. The slide-type wireless terminal apparatus according to claim 8, further comprising a ground wiring coupled to the sliding member.

14. The slide-type wireless terminal apparatus according to claim 8, wherein the first circuit board is not located between the antenna and the second circuit board.

15. The slide-type wireless terminal apparatus according to claim 8, wherein the thickness direction of the first casing is perpendicular to the longitudinal direction of the first casing.

* * * * *